Aug. 8, 1939.                    C. H. RIPPL                       2,168,629
                   PNEUMATICALLY OPERATED ELECTRIC CONTACTOR
                          Filed Feb. 11, 1938            2 Sheets-Sheet 1
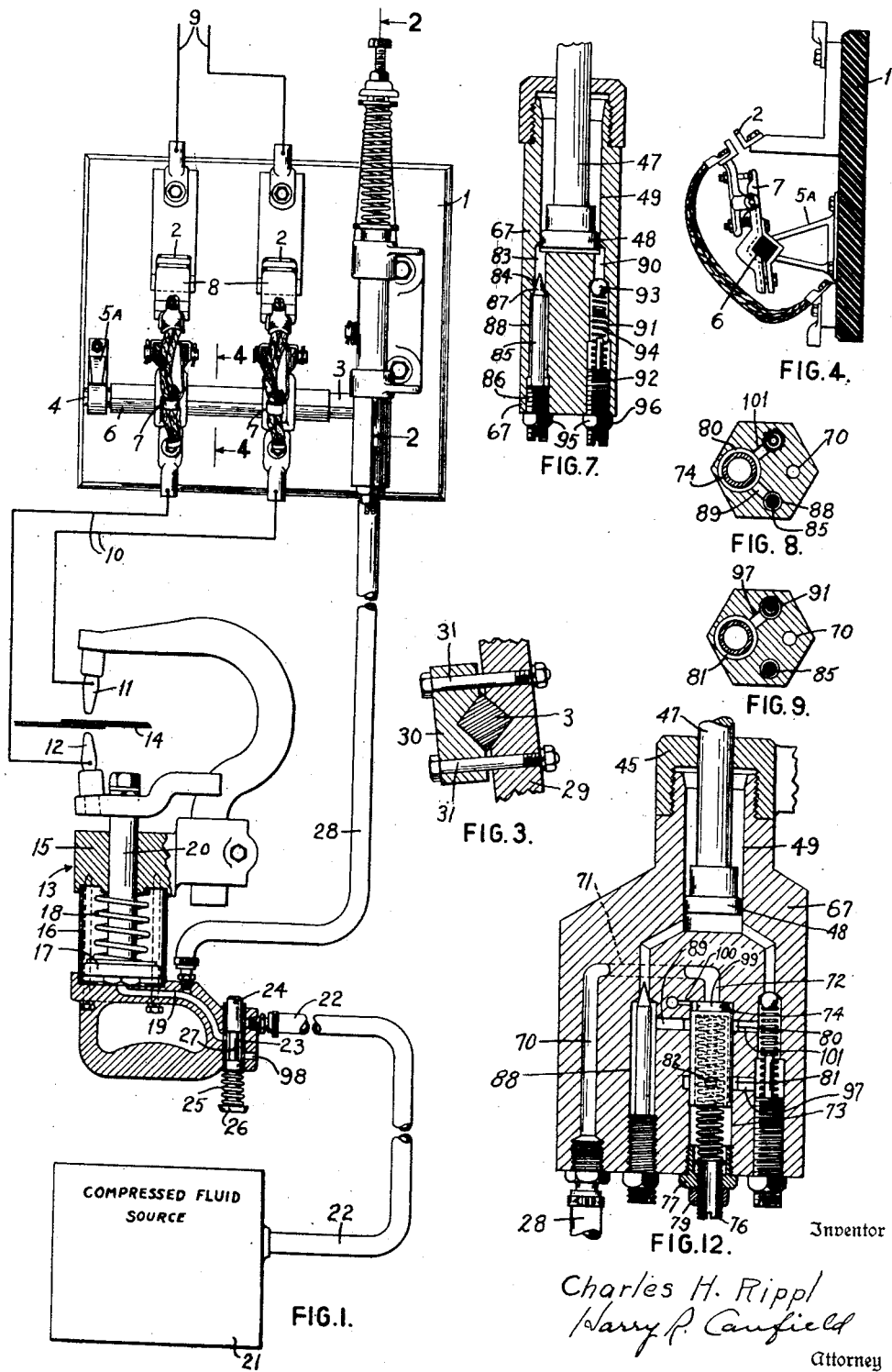
Inventor
Charles H. Rippl
Harry P. Canfield
Attorney Aug. 8, 1939.  C. H. RIPPL  2,168,629
PNEUMATICALLY OPERATED ELECTRIC CONTACTOR
Filed Feb. 11, 1938  2 Sheets-Sheet 2
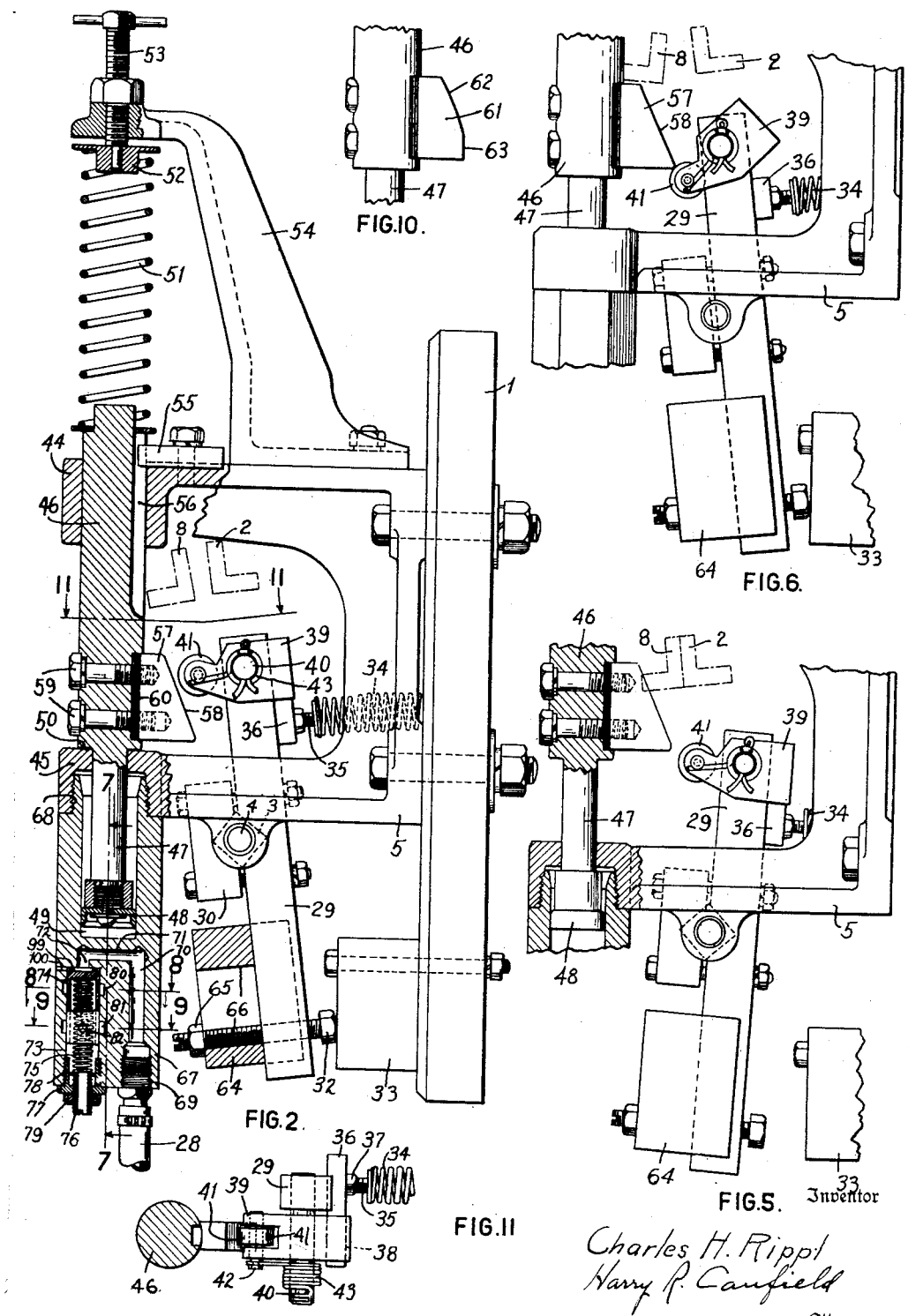
Inventor
Charles H. Rippl
Harry R. Canfield
Attorney Patented Aug. 8, 1939

2,168,629

UNITED STATES PATENT OFFICE 2,168,629

PNEUMATICALLY OPERATED ELECTRIC CONTACTOR

Charles H. Rippl, Cleveland, Ohio, assignor to The Clark Controller Company, Cleveland, Ohio, a corporation of Ohio Application February 11, 1938, Serial No. 189,969

7 Claims. (Cl. 200—82)

This invention relates to electric contactors for, making, breaking, and controlling the duration of, electrical currents.

While the invention may have various applications, it is particularly applicable to time the duration of the electric current in the welding electrodes of a welding gun, or machine.

The invention may be practiced with advantages in connection with welding guns and machines which are operated pneumatically, in which cases, the current timing contactor may likewise be operated pneumatically.

It is among the objects of the invention:

To provide generally an improved current timing electric contactor;

To provide a pneumatically operated electric contactor having improved means for timing the duration of the current controlled thereby;

To provide an improved welding current control contactor adapted in an improved manner to be operated by fluid pressure under the control of a welding apparatus using the current, such for example, as a welding gun;

To provide a pneumatically operated current timing contactor having improved means to adjust the time interval during which the contacts of the contactor remain closed;

To provide a pneumatically operated current timing contactor adaptable, by improved means, to the timing of current impulses of relatively long duration;

To provide a pneumatically operated electric contactor having improved means to prevent irregular operation of the contactor by pneumatic pressure below a predetermined minimum value;

To provide a pneumatically operated electric contactor having improved means to insure quick restoring of the contactor operating elements;

To provide a pneumatically operated electric contactor having improved means to time the rate of restoring of the contactor operating elements to thereby time the frequency at which successive operations may occur.

Other objects will be apparent to those skilled in the art to which my invention appertains.

My invention is fully disclosed in the following description taken in connection with the accompanying drawings in which:

Fig. 1 is a front elevational view of a contactor embodying my invention and showing its use in connection with a welding gun;

Fig. 2 is a longitudinal sectional view to an enlarged scale taken from the plane 2—2 of Fig. 1;

Fig. 3 is a fragmentary view illustrating in cross-section parts shown in elevation in Fig. 2;

Fig. 4 is a cross-sectional view taken from the plane 4—4 of Fig. 1;

Figs. 5 and 6 are views generally similar to Fig. 2 but with parts broken away and with operative parts in different positions;

Fig. 7 is a longitudinal sectional view of a part of Fig. 2 taken from the plane 7—7 of Fig. 2;

Figs. 8 and 9 are respectively cross sectional views taken from the planes 8—8 and 9—9 of Fig. 2;

Fig. 10 is a fragmentary view illustrating in modified form one of the operating elements of Figs. 2, 5 and 6;

Fig. 11 is a top plan view of a part of the device of Fig. 2 taken from the plane 11—11 of Fig. 2;

Fig. 12 is a developed view showing in one figure, parts shown separately in Figs. 2 and 7.

Referring to the drawings, I have shown at 1 a panel preferably of insulating material upon which a pair of stationary contacts 2—2 are mounted. A rectangular shaft 3 having round ends 4 is oscillatably supported in brackets 5 and 5A and has a rectangular tube of insulation 6 thereon upon which are clamped movable switch arms 7—7 carrying contacts 8—8 which are moved to engage and disengage the stationary contacts 2—2 when the shaft is oscillated in a manner to be described. When the contacts 2 and 8 are engaged, an electric circuit is made from supply mains 9—9 through the engaged contacts to wires 10—10 connected to the stationary electrode 11 and the movable electrode 12 of a welding gun shown generally at 13 whereby when the movable electrode 12 moves, work to be welded 14 will be clamped between the electrodes and current may be caused to flow therethrough to effect a weld.

The construction of the gun 13 comprises no essential part of the present invention. In the form shown, a head 15 supports the stationary electrode 11, and the cylinder 16 on the head has a piston 17 normally held in one end of the cylinder by a spring 18 and arranged to be moved toward the other end of the cylinder when air is admitted to the cylinder through a duct 19 and the movement of the piston 17 being communicated to the movable electrode 12 by a piston rod 20.

To operate the gun, compressed air or other fluid under pressure is conducted from a source 21 through a conduit 22 to a valve cylinder 23 in the gun in which reciprocates a gun valve 24. The valve is normally constrained by a valve spring 25 to take up the position illustrated in which flow from the conduit 22 is obstructed. When a button 26 on the valve 24 is depressed against the force of the spring 25, fluid under pressure from the conduit 22 may flow around a neck 27 of the valve to the duct 19 to operate the gun. Upon releasing the button, air from the gun is discharged through the duct 19 and around the neck 27 of the valve and exhausted out to atmosphere at a port 98.

Communicating with the duct 19 between the valve 24 and the gun cylinder 16 is a conduit 28 through which fluid under pressure may flow to operate the contactor contacts above referred to by means presently to be described.

By the contactor operating means to be described, the contactor is caused to close and remain closed for a time interval and then is caused to open, thus sending through the electrodes 11—12 an electric current of predetermined time duration suitable to make the weld; and the contactor is closed after the pressure engagement of the electrodes 11—12 on the work 14 has been effected by the gun.

Rigidly clamped upon the rectangular portion of the shaft 3 is an arm 29, one suitable arrangement for clamping it being shown in Fig. 3 and comprising a block 30 recessed to fit the shaft 3, the arm 29 being similarly recessed and bolts 31—31 drawing the block 30 and the arm 29 rigidly upon opposite sides of the shaft to seat the shaft in the recesses.

The lower end of the arm 29 is provided with a screw 32 which abuts upon a block 33 bolted to the panel, the screw 32 being adjustable in the arm 29 and adjustably stops the arm 29 in the contactor open position as shown in Fig. 2, the stationary contact 2 and the movable contact 8 being shown diagrammatically in that figure in the position which they occupy when the contactor is open and the parts are in their normal position.

The arm 29 is constrained to its counter-clockwise normal position illustrated by a spring 34 abutting at one end upon the panel 1 and at its opposite end abutting upon an adjustable screw stud 35.

As shown in Fig. 11, the stud 35 may be screwed into a cross arm 36 extending laterally from the arm 29 on one side thereof, and secured to the arm by a bolt 37, and extending from the other side of the arm 29 (as shown in dotted line at 38) to constitute the back stop of a pivoted ratchet element 39.

The ratchet element 39 oscillates on a pin 40 driven into the arm 29 and extending therefrom. A roller 41 is mounted on a pin 42 in a fork on the end of the ratchet element 39, and the ratchet element is constrained to take up a clockwise position with its rearward end, opposite the roller 41, abutting upon the portion 38 of the cross arm 36 by a spring 43 wound around the end of the pin 40 and anchored thereto and having a free end engaging the underside of the pin 42.

The bracket 5, secured to the panel 1, and which supports one of the round ends 4 of the shaft 3, is provided with a vertically spaced pair of upper and lower bosses 44 and 45. In the upper boss 44 is reciprocably supported a plunger 46, the lower end of which is of reduced diameter and reciprocably mounted in the lower boss 45 and constitutes a piston rod having on the lower end thereof a piston 48 reciprocable in a cylinder 49 to be described. Normally the plunger 46 is supported on the lower boss 45 by the shoulder at 50 at the reduction of diameter thereof and the plunger 46 is yieldably held downward on the boss 45 by a spring 51 abutting at its lower end upon the upper end of the plunger and at its upper end abutting upon a spring head 52 adjustably movable up and down by a screw 53 to adjust the compression of the spring 51, the screw 53 being threaded into the upper end of a standard 54 mounted upon the upper side of the bracket 5.

The plunger 46 is prevented from rotating by a finger 55 secured to the upper portion of the bracket 5 adjacent the upper boss 44 and projecting into a groove 56 in the plunger.

A cam 57 having an inclined cam face 58 is secured to one side of the plunger between the bosses 44 and 45 by a pair of screws 59—59 and if desired, may be adjusted toward and from the plunger by shims 60 disposed between the plunger and the cam.

When the plunger 46 is reciprocated upwardly by means to be described, the cam face 58 will move into engagement with the roller 41 on the arm 29, the arm being adjusted so that the roller will be adjacent to but preferably not touching the cam face, and the roller 41 will roll over the cam face 58, and the arm 29 will therefore be rocked clockwise together with the shaft 3 to which it is secured. After the initial part of the movement, the movable contactor contact 8 will be carried into engagement with the stationary contact 2 to close the electric circuit. After the cam 57 has moved upwardly sufficiently far, the roller 41 will be released and the spring 34 will return the arm 29 counter-clockwise, opening the contactor contacts 8—2, the arm 29 returning to its normal position illustrated in Fig. 2. At this time, the cam 57 will be above the roller 41. As the plunger 46 returns downwardly to its normal position, the lower side of the cam 57 will engage the roller but will not be effective to move the contactor arm and operate the contactor because the roller, being mounted on the ratchet element 39, will rock the ratchet element as shown in Fig. 6 and the cam 57 will pass beyond the roller and then the roller will snap back under the force of the spring 43 to its normal position of Fig. 2, being stopped upon the cross arm 36, as described.

Means to be described supplies fluid pressure at an adjustable rate to the under side of the piston 48 in the cylinder 49 to move the plunger 45 upwardly. If the pressure be supplied at an adjustably reduced rate, the roller 41 will remain in contact with the cam face 58 throughout the stroke of the plunger and the duration of the current impulse will be determined solely by the speed of the plunger 46 and the length vertically of the cam face 58.

When this mode of operation is desired, and a long current impulse is wanted, a cam such as shown at 61 in Fig. 10 may be utilized having besides the surface 62 which will initially effect the closing of the contacts, a surface 63 which will hold the contacts closed without further movement during continued movement of the plunger 46.

In other cases, for example when impulses of relatively short duration are wanted, the plunger 46 will move upwardly more rapidly and then the arm 29 will be rocked clockwise with greater velocity and after the cam face 58 has left the roller 41, the arm 29 will continue in its clockwise direction by the inertia thereof opposed by the spring 34.

To adjust such time intervals, for a given tension of the spring 34, the inertia of the arm 29 may be varied by means of a weight 64 secured to the arm 29 by a nut 65 on the screw 32 above referred to, which is threaded into the arm 29; and by means of a slot 66 in the weight 64, it may be moved toward and from the axis of the shaft 3 whereby the kinetic inertia of the arm unit including the weight 64 will be varied adjustably.

The arm 29 when in the process of being thrown from the cam 57 by inertia is illustrated in Fig. 8.

In any case, the rate of acceleration at which the plunger moves upwardly and therefore the time it takes to complete its stroke may be adjusted by the spring 34 which also functions to return the plunger downwardly.

After the plunger 46 has been moved upwardly by fluid pressure, it is necessary of course to exhaust the pressure from the cylinder 49 under the piston 48 to permit the plunger 46 to return and to cause the contactor contacts again to open. The means for controlling the admission of fluid under pressure to the cylinder 49 adjustably and to control the exhaust therefrom will now be described.

The cylinder 49 is formed in a cylinder head 67 threaded at its upper end as at 68 whereby it may be screwed into the under side of the lower boss 45 to close the upper end of the cylinder and to align it with the piston rod 47.

At the lower end of the cylinder head 67 is a threaded opening 69 to which a nipple on the end of the conduit 28 may be screwed and a duct 70 communicates therewith (see Figs. 2, 12, 8 and 9).

The duct 70 communicates with a cross duct 71 opening downwardly through a short duct 72 into a valve bore 73 in which reciprocates a piston valve 74 of tubular form closed at its upper end and open at its lower end. A spring 75 within the valve abuts at its upper end on the closed end of the valve and holds the valve upwardly to seal the duct 72, the top of the valve having an annular bead 99 thereon to insure a seal. The lower end of the valve spring 75 abuts upon the upper end of a tubular screw threaded into the head 77 of a cup-form cap 78, the skirt of which is threaded into the lower end of the bore 73, the tubular screw 76 being locked by a lock nut 79. By adjusting the screw 76, the compression of the spring 75 on the valve 74 may be varied.

The valve bore 73 is enlarged to provide an upper and a lower annular chamber 80 and 81 respectively between the ends of the valve 74 and the valve is provided with one or more ports 82 through the wall thereof which, when the valve is in its normal upper position illustrated, effects communication between the interior of the valve and the lower annular chamber 81.

The cylinder 49 has a fluid admission duct 83, see Fig. 7, having a valve seat 84 therein and a valve stem 85 is threaded as at 86 into the lower end of the cylinder head 67 and has a needle valve 87 to vary the size of the opening into the duct 83; the shank or upper portion of the valve stem 85 being disposed longitudinally of a bore 88 larger than the shank.

As shown in Fig. 8, a cross duct 89 connects the needle valve bore 88 with the upper annular chamber 80.

A fluid exhaust duct 90 communicating with the cylinder and extending downward therefrom, see Fig. 7, opens into a bore 91 in which is threaded a screw 92. A ball check valve 93 normally closes the lower end of the duct 90 and is held in closing position by a spring 94, the pressure of the spring being adjustable by the screw 92.

The lower ends of the bores 88 and 91 are sealed by lock nuts 95 and 96 on the threads of the needle valve 85 and screw 92.

A cross duct 97, see Fig. 9, connects the lower annular chamber 81 with the bore 91.

A small diameter bleeder duct 100 effects restricted communication of the valve bore 73, at a point above the valve 74, with the atmosphere. A duct 101 connects the annular chamber 81 with the bore 91 at a point below the valve ball 93.

The above described interior construction of the cylinder head 67 is shown in Fig. 12 developed for convenience of reference into a single sectional plane; and in fact, it may, if preferred, be constructed as shown in that figure.

In the operation of the valve arrangement in the cylinder head 67 just described, fluid under pressure enters by the conduit 28 and passing through the ducts 70, 71 and 72 is shut off by the seal at the upper end of the valve 74. It is one of the advantages of this invention that the operation of the contactor as above described will not occur until the pressure to operate it has reached a certain predetermined value so that, as a result repeated operations occur positively and produce time intervals of current flow of not greater than a predetermined maximum. If variations of source pressure were communicated directly to the contactor cylinder 49, or if the pressure communicated to the cylinder 49 were a rising pressure or were otherwise to vary, the contactor operating pressure value in the cylinder 49 would be reached irregularly, and at one time would be attained more rapidly or more slowly than at another time, so that in one case the contactor would be operated quickly and in another case sluggishly. By the arrangement illustrated however, no operation at the contactor can occur until the pressure has reached a predetermined value which as will now be understood, is determined by the tension of the spring 75 holding up the valve 74. When however, this pressure has been reached, the piston valve 74 will move downwardly and will first close off the port 82 by moving it into the valve bore 73 below the lower annular chamber 81. The valve will continue to move downwardly until the upper end of the valve moves into alignment with the upper annular chamber 80 whereupon the fluid enters this annular chamber and then flows therefrom through the cross duct 89 to the needle valve bore 88 and thence through the needle valve 84—87 into the cylinder 49 to force upwardly the piston 48 to operate the contactor as above described.

It will be observed that the valve 74 seals the upper end of its bore 73, on the bead 99, which is of smaller diameter than the upper end of the valve. The valve opening pressure is that applied upon a small valve diameter but as soon as the valve starts to move and breaks the seal at the bead 99, the full area of the valve end is exposed to the operating pressure. Thus a quick snap action of the valve is effected causing it to move instantly to open position when it starts. In some cases, if the seal at the bead 99 were not perfect, the air under pressure might leak around the bead, and before the pressure has attained the value at which it is desired to operate the contactor, such smaller pressure acting upon the full area of the valve might operate it, resulting in premature low-pressure-operation of the contactor. To avoid these effects of leakage around the bead 99, the said bleeder duct 100 may, if desired, be provided to exhaust the leakage air to atmosphere so that it cannot accumulate sufficiently to move the valve.

The time interval during which the contactor contacts will remain closed may be adjustably varied by adjusting the needle valve 87, as above referred to.

As stated, the piston valve 74 prevents admission of operating air to the contactor cylinder until the pressure has attained a predetermined amount; so also, similarly, the operating plunger 46 will not be returned to its lower starting position until the fluid pressure has been reduced. This will insure that the operator of the gun 13 will have released the button 26 to allow the air under the gun piston 17 to discharge outwardly through exhaust port 98 on the gun which, in turn, insures that the plunger 46 will not return until the electrodes of the gun have been opened. Thus there is no danger that the contactor will again close or "repeat" unintentionally.

When, however, the gun button 26 has been released and the gun pressure has exhausted at the port 98 thereon, and the supply of fluid pressure from the conduit 22 has thus been cut off, the pressure in the cylinder 49 will be relieved and this reduced pressure being communicated to the upper end of the valve 74 will permit the spring 75 to move the valve upwardly and the port 82 will then communicate with the lower annular chamber 81. Thereupon the plunger 46 will fall and the piston 48 will force the fluid downwardly through the duct 90, opening the check valve 93, and into the bore 91, and thence will flow by duct 97 to the annular chamber 81 and thence through the port or ports 82 into the interior of the valve 74 and thence downwardly through the tubular screw 76 to the atmosphere.

Thus when the pressure is released, the plunger will return or reset instantly to be in position as soon as possible for another operation.

In cases in which the needle valve 87 is adjusted for a very slow flow of fluid to the cylinder 49, there may be enough leakage out of the cylinder 49 by way of the duct 90, bore 91, duct 97, annular chamber 81 and around the piston valve and out through the tubular screw 76, to prevent accumulation of pressure in the cylinder 49 and to interfere with the desired slow movement of the plunger 46. It is to prevent such leakage that the duct 101 is provided. This duct communicates the full source pressure to the underside of the ball 93 when the valve 74 has moved down, which holds the ball firmly on its seat and effectively seals the duct 90.

Thus, as will be seen, the contactor cannot be operated until the pressure for operating it has attained a suitable operating value at which it will in every case operate the contactor for the same time interval; and that this time interval can be widely adjusted for different time periods; and that the contactor operating plunger will not be reset for another operation until the pressure has been fully released by the release operation at the welding device; and that the operating pressure will not be attained until after the gun or other device has been fully operated to engage the electrodes with the work; and that unintended repeating of the contactor is prevented; and that for any pressure adjustment of the piston valve 74 by the spring 75 and any timing by the needle valve 84—87, the current duration may be further adjusted at the spring 34; and also by the inertia weight 64 when the interval is to be short.

Subject matter illustrated and described but not claimed herein constitutes the subject matter of the co-pending applications of Charles H. Rippl, Serial No. 62,795, filed February 7, 1936, for improvements in Welding current control apparatus and of Edward G. Beiderman, Serial No. 84,981, filed June 13, 1936, for improvements in Time controlled electric switch.

It will be understood by those skilled in the art that when pressure is first admitted to the cylinder 16 and expands therein, the pressure in the conduit 28 will be less than full pressure, but will gradually rise; and when the electrodes 11 and 12 have been engaged and further movement of the piston 17 and further expansion in the cylinder 16 is stopped, the pressure rises in the conduit 28 and the duct 70 to a high value. It is this rising pressure which is referred to above as applied at the upper end of the valve 74.

Whereas in Fig. 1 I have illustrated the electrodes 11—12 as connected directly to the supply mains 9—9 when the contactor is operated, it is to be understood that, as is well known in practice, the electrodes may be energized from the mains 9—9 through a transformer.

My invention is not limited to the exact construction illustrated and described but includes all changes and modifications which may be made therein and mechanical equivalents thereof which come within the scope of the appended claims.

I claim:

1. In a pneumatically operable contactor mechanism, an expansible and contractible chamber having a movable wall, an electric contactor, mechanism means effective upon movement of the movable wall by application of fluid pressure to the chamber to both operate and restore the contactor and ineffective to operate the contactor when the pressure in the chamber is relieved, means providing a fluid pressure admission passageway leading to the chamber, a fluid pressure exhaust passageway leading from the chamber, a valve comprising a valve element controlling both passageways and biased to a normal position in which it closes the admission passageway and opens the exhaust passageway and being subjected to admission pressure in the admission passageway and movable thereby to open the admission passageway and close the exhaust passageway upon admission of fluid to the admission passageway at pressure above a predetermined value only, to insure operation of the contactor at fluid pressures above said minimum pressure only.

2. The apparatus described in claim 1 and in which a check valve in the exhaust duct yieldably maintains the exhaust duct closed, and in which means is provided to apply fluid pressure to the check valve in the closing direction to hold it closed upon admission of fluid pressure to the chamber.

3. The apparatus described in claim 1 and in which an adjustable port is provided in the admission passageway to control the rate at which fluid pressure is supplied to the cylinder, to control the time during which the contactor remains operated.

4. The apparatus described in claim 1 and in which the valve element is biased by a spring and means is provided to adjust the tension of the spring to adjustably change the said predetermined pressure value.

5. The apparatus described in claim 1, and in which a check valve is provided in the exhaust duct and a spring yieldably holds it closed, and means is provided to adjust the tension of the spring to adjustably vary the rate at which the fluid pressure exhausts from the chamber through the exhaust duct to adjust the rate at which the chamber contracts to restore the movable wall.

6. The apparatus described in claim 1, and in which a check valve is provided in the exhaust duct and a spring yieldably holds it closed, and means is provided to adjust the tension of the spring to adjustably vary the rate at which the fluid pressure exhausts from the chamber through the exhaust duct to adjust the rate at which the chamber contracts to restore the movable wall, and in which means is provided to apply fluid pressure to the check valve in the closing direction to hold it closed upon admission of fluid pressure to the chamber.

7. The apparatus described in claim 1 and in which a valve is provided in the line of the exhaust passageway and means is provided to adjust the valve to adjustably vary the rate at which the fluid pressure exhausts from the chamber through the exhaust passageway to adjust the rate at which the chamber contracts to restore the movable wall.

CHARLES H. RIPPL.